(12) United States Patent
Khoshnevis

(10) Patent No.: US 8,047,251 B2
(45) Date of Patent: Nov. 1, 2011

(54) REDUCTION OF POWDER WASTE IN SELECTIVE INHIBITION OF SINTERING

(75) Inventor: Behrokh Khoshnevis, Marina Del Rey, CA (US)

(73) Assignee: University of Southern California, Los Angeles, CA (US)

( * ) Notice: Subject to any disclaimer, the term of this patent is extended or adjusted under 35 U.S.C. 154(b) by 766 days.

(21) Appl. No.: 11/936,059

(22) Filed: Nov. 6, 2007

(65) Prior Publication Data

US 2008/0111271 A1 May 15, 2008

Related U.S. Application Data

(62) Division of application No. 10/742,511, filed on Dec. 19, 2003, now Pat. No. 7,291,242.

(60) Provisional application No. 60/435,936, filed on Dec. 20, 2002.

(51) Int. Cl.
*B29C 65/00* (2006.01)
*B32B 37/00* (2006.01)

(52) U.S. Cl. ......... 156/497; 156/499; 219/405; 392/379

(58) Field of Classification Search .................. 219/395, 219/398, 405, 410, 475, 480; 392/360, 365, 392/375, 376, 379, 380, 383, 384, 385, 410; 156/497, 499; 264/125, 497
See application file for complete search history.

(56) References Cited

U.S. PATENT DOCUMENTS

| 3,733,709 | A | | 5/1973 | Bassemir et al. |
| 3,860,894 | A | * | 1/1975 | Popovic et al. ............... 335/258 |
| 3,947,659 | A | * | 3/1976 | Ono .............................. 392/404 |
| 4,350,872 | A | * | 9/1982 | Meywald et al. ............. 338/299 |
| 4,665,630 | A | * | 5/1987 | Postbeschild ................... 34/566 |
| 5,868,148 | A | * | 2/1999 | Lindsey et al. ............... 132/271 |
| 6,193,923 | B1 | | 2/2001 | Leyden et al. |
| 6,589,471 | B1 | | 7/2003 | Khoshnevis |
| 2001/0045678 | A1 | | 11/2001 | Kubo et al. |

FOREIGN PATENT DOCUMENTS

| RU | 2109768 | 4/1998 |
| WO | WO 01/38061 | 5/2001 |

OTHER PUBLICATIONS

Khoshnevis, et al., "SIS—A New SFF Method Based on Powder Sintering", *Solid Freeform Fabrication Proceedings*, Austin, TX; Ed. Bourell et al., pp. 440-447 (2002).

* cited by examiner

*Primary Examiner* — John Goff
(74) *Attorney, Agent, or Firm* — Fish & Richardson P.C.

(57) ABSTRACT

Disclosed are methods and systems for selective inhibition of sintering in 3D fabrication. The disclosure provides methods and systems that use selective heating arrangements to selectively sinter areas during fabrication thereby reducing waste improving efficiency.

8 Claims, 10 Drawing Sheets

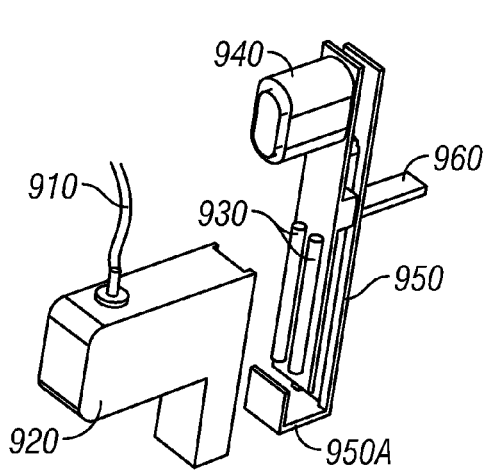
FIG. 9A
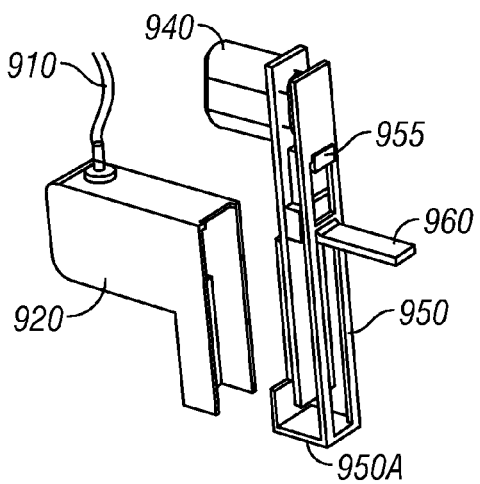
FIG. 9B
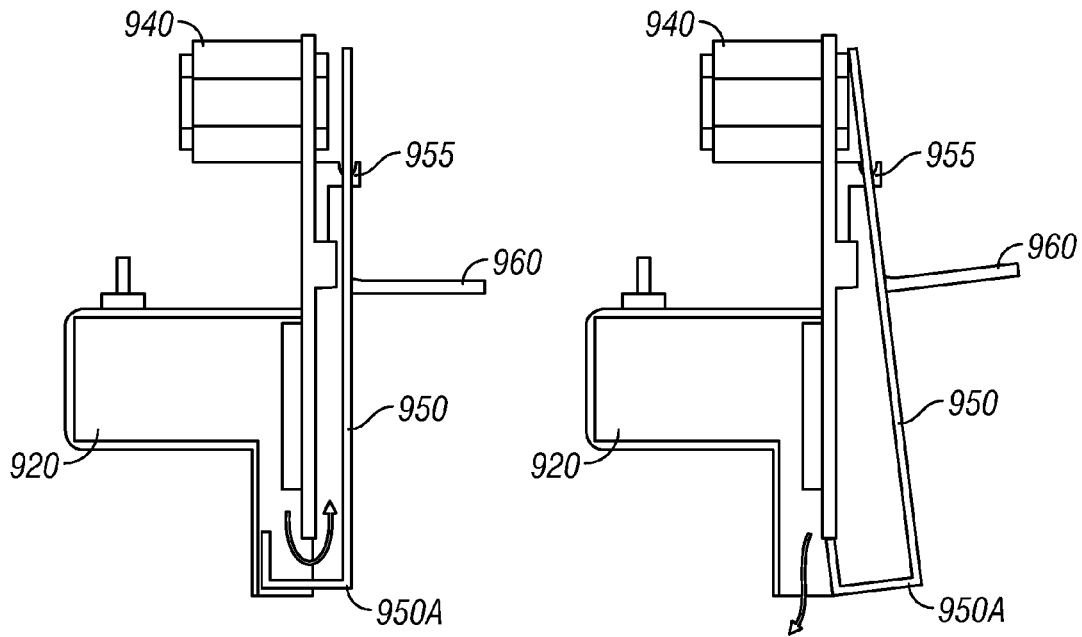
FIG. 10A
FIG. 10B

REDUCTION OF POWDER WASTE IN SELECTIVE INHIBITION OF SINTERING

CROSS REFERENCE TO RELATED APPLICATIONS

This application is a divisional application of U.S. patent application Ser. No. 10/742,511 filed Dec. 19, 2003, entitled "Methods for Reduction of Powder Waste in Selective Inhibition of Sintering (SIS)" which issues as U.S. Pat. No. 7,291,242 and claims priority under 35 U.S.C. §119 from Provisional Application Ser. No. 60/435,936 filed Dec. 20, 2002. The entire disclosures of the above two prior patent applications are incorporated herein by reference.

TECHNICAL FIELD

The present disclosure generally relates to fabrication of three-dimensional objects, and more specifically, to selective reduction of powder waste in selective inhibition of sintering during fabrication of such objects.

BACKGROUND

Three-dimensional (3-D) objects, such as prototype parts, may be produced directly from computer-aided design databases. Various technologies are known to produce such objects, particularly through the use of layered additive processes. Commercially adapted methods of layered manufacturing use various forms of materials. For example, stereolithography (STL) uses a resin photopolymer resin that is selectively hardened by a laser beam delivering UV light at desirable spots on each thin resin layer. Fused Deposition Method (FDM) uses a plastic filament that is forced through a hot nozzle that deposits the material to form each layer. Laminated Object Manufacturing (LOM) laminates cut sheets of a special paper to create 3D parts. Two processes commonly used are 3D printing and Selective Laser Sintering (SLS). Three-Dimensional printing (3DP) uses adhesive droplets deposited on each thin powder layer to create bonding of powder particles in selected spots of each layer. Selective Laser Sintering (SLS) selectively bonds powdered material using laser. SLS works by depositing and heating by means of a scanning laser beam, which bonds powder material at selected locations of the powder layer. The powder material may include polymer, ceramic, or metal.

However, layer-by-layer selective bonding processes, such as SLS and 3-D Printing, are time consuming and expensive. For example, those methods that use a laser incur the high cost of the laser and the low scanning speed due to relatively wide cross-section area per layer for sintering compared to the beam size. For other methods, difficulties occur from the slow process of scanning the entire volume of the object, layer by layer, by sintering or other fusion process. Furthermore, when sintering or heating a selected area, a relatively uniform temperature needs to be maintained on the powder surface in order to prevent deformations.

SUMMARY

In recognition of the above-described difficulties, the disclosure provides a faster and cheaper method and system than the conventional method.

Disclosed is a method for fabricating a three-dimensional (3D) object. The method includes providing a layer of powder material of a type that is changed to a bonded form by heating; causing selective bonding of areas of said layer of powder material by selectively heating parts of areas; and repeating said providing and causing selective bonding, until said bonding results in a desired 3-D object being formed. The method may further include selecting areas to receive a bonding inhibitor according to a cross-sectional design of said 3-D object; and selectively depositing the bonding inhibitor on selected areas of said layer of powder material prior to said causing selective bonding.

The disclosure also provides a selective heating apparatus for fabricating a three-dimensional (3-D) object. The selective heating apparatus comprises an air manifold; a heating element, in fluid communication with the air manifold, producing heated air, and outputting said heated air via said air manifold; an actuator; a shutter lever comprising a first end proximal to the actuator; and a distal end; and a shutter located at the distal end of the shutter lever such that the actuator is capable of moving the shutter lever from a first position to a second position thereby moving the shutter at the distal end, the shutter being in fluid communication with the heating element and air, such that movement of the shutter causes a deflection in the air movement.

The disclosure provides a selective heating apparatus for fabricating a three-dimensional (3-D) object including a radiant heating element; an actuator; a shutter lever comprising a first end proximal to the actuator; and a distal end; and a shutter located at the distal end of the shutter lever, wherein the actuator is capable of moving the shutter lever from a first position to a second position thereby moving the shutter at the distal end, wherein movement of the shutter causes a deflection in heat.

The details of one or more embodiments of the invention are set forth in the accompanying drawings and the description below. Other features, objects, and advantages of the invention will be apparent from the description and drawings, and from the claims.

DESCRIPTION OF DRAWINGS

FIGS. 9A and B show two views of a selective hot air heating element.

FIGS. 10A and B show two view of a selective hot air heating element in (A) off position and (B) on position.

Like reference symbols in the various drawings indicate like elements.

DETAILED DESCRIPTION

Figure 1A:
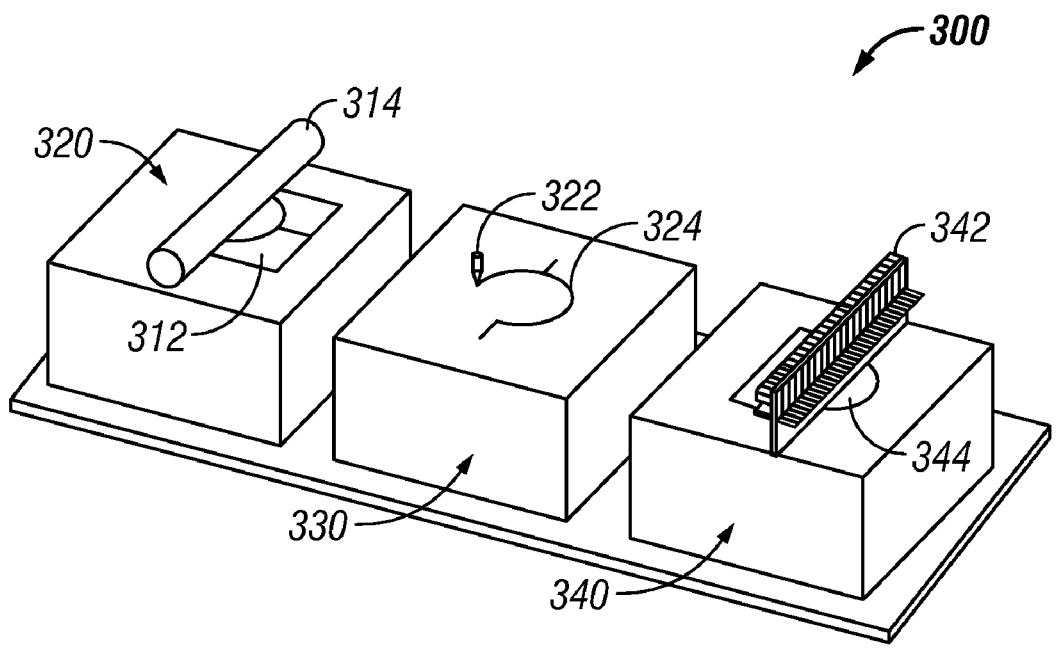
FIGS. 1A-1C illustrate a selective inhibition sintering (SIS) process.

A selective inhibition sintering (SIS) process 300 is illustrated in FIG. 1. Three different surfaces: 320, 330 & 340 may be processed. The process 300 includes a thin, evenly distributed layer of powder 312. A sintering inhibitor liquid may be applied to the areas of the powder that fall on the boundary of part cross-section on the layer. A selective heating element 342 may then be used to sinter the powder 312 that is inside a cross-section 324 of the part to be fabricated. The cross-section 324 may be sintered according to a 3D computer-aided design (CAD) model of the prototype. The energy added by the selective heating element 342 heats the powder 312 into a glass-like state and individual particles coalesce into a solid. The selective heating element heats only an area requiring sintering for fabrication. Selective heating element 342 is shown as a bar heater having a plurality of shutters that open and close thereby controlling exposure of the heat energy used to selectively heat a desired area (see, also FIGS. 5-12). Sufficient energy is directed to the powder so as to cause it to fuse into the desired part cross-section. For most powders processed in this manner, including wax, plastic and metallic powders, the fusing mechanism includes sintering, in which the surface tension of the irradiated powder overcomes its viscosity, such that the particles flow together and bond. As such, the temperature at which sintering occurs is substantially lower than the melting or softening point of the powder material. Once the heating element 342 has scanned the entire cross-section 324, another layer of powder 312 is laid on top and the whole process is repeated. Additional powder is supplied from a powder storage container, and is distributed with a roller 314.

As part of a selective inhibition of bonding process, bonding inhibitors may be applied to certain areas of the powder layer located on the part profile boundary on that layer (as specified by a CAD cross-section). Such inhibitors are added to the boundary of a fabrication part to generate a separation field. After application of the bonding inhibitors, the entire layer may be exposed only once to a heating element which serves to bond or sinter the un-inhibited powder. As described further herein, the selective heating element also serves to selectively bond particular regions of the powder layer. Thus, the disclosure provides an efficient method and system for fabrication that serves to reduce powder waste.

Accordingly, the selective inhibition of sintering (SIS) process offers advantages over the selective bonding process (e.g. SLS and 3-D Printing (3DP)) where the bonding inhibitors are applied to some selected areas of the powder layer. For example, adhesion (as in 3DP) or sintering (as in SLS) is required over the entire cross-sectional area. The selective bonding by either inkjet printing (3DP) or by a scanning laser beam (SLS) sweeping the entire cross-section areas is time consuming. In contrast, the SIS process selectively applies in one aspect a bonding inhibitor to a part's cross-section boundary in each layer and, by means of a heater apparatus, also allows for selective sintering of areas. Therefore, the SIS process may be performed significantly faster than the selective bonding process. Furthermore, concurrently subjecting larger areas of powder layer to uniform heat, as opposed to subjecting a series of small areas under a heating element minimizes deformation and reduces powder waste. The selective inhibition of sintering process offers better dimensional control, reduced machine cost, and reduced fabrication time, than the selective bonding processes.

Figure 2:
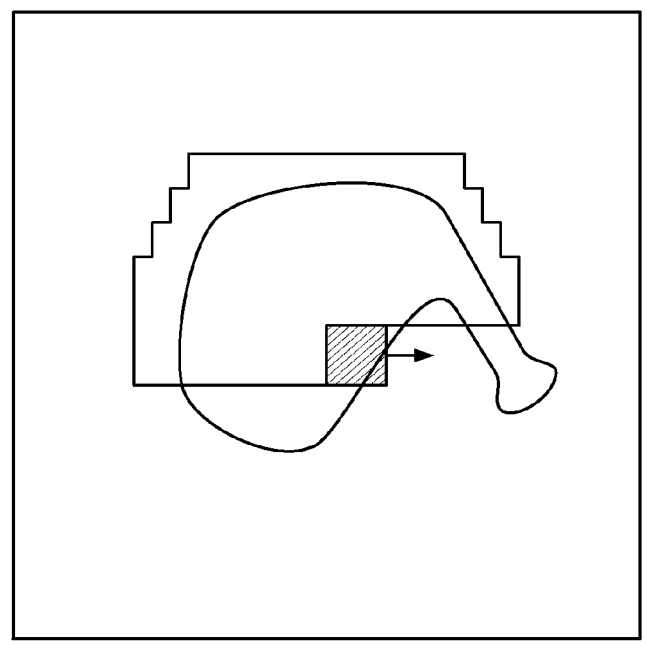
FIG. 2 shows a rectangular selective heating element with a raster scanning movement pattern.
Figure 3:
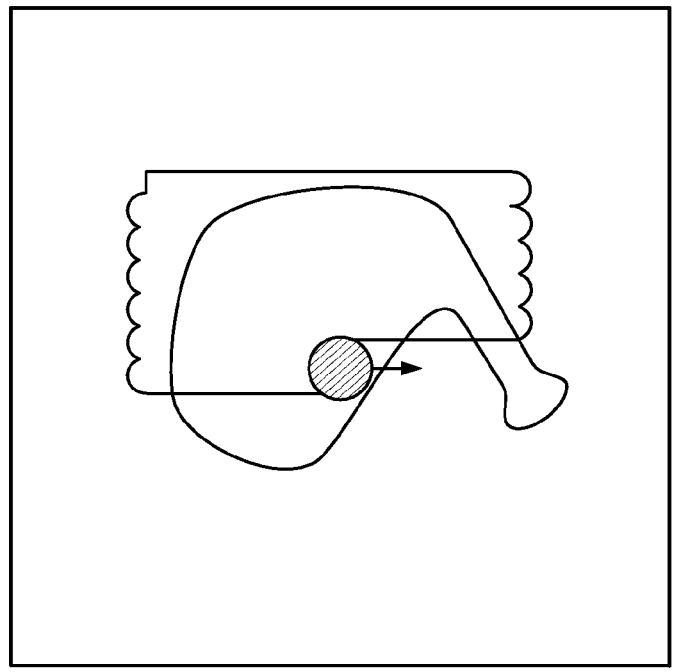
FIG. 3 shows a circular selective heating element with a raster scanning movement pattern.

FIG. 2 shows a selective heating element used in raster scan sintering. Raster scan sintering uses the movement of a heating element over an area to be sintered in a raster fashion. In this embodiment of the SIS process, a small heat element which can radiate heat on an area which may be (but need not have to be) larger than the smallest layer profile geometric feature may be used. The element may be attached to the same drive mechanism, which moves a print head associated with deposition of sintering inhibitors. After the printing of the inhibitor for a profile is completed, a selective heating element is moved over the desired areas of the powder in side-to-side raster scanning or other patterns such that the overall time of sintering is minimized. FIG. 3 shows one such scanning pattern for the given part profile. In this figure, a heater with a rectangular radiation surface is used. The gray area is the powder bed, the line is the part layer profile where the inhibitor is deposited, the rectangle is the heater exposure area, and the dark gray area is the sintered (bonded with heat) section of the powder. FIG. 3 shows the same pattern when a circular spot heater is used.

Figure 4:
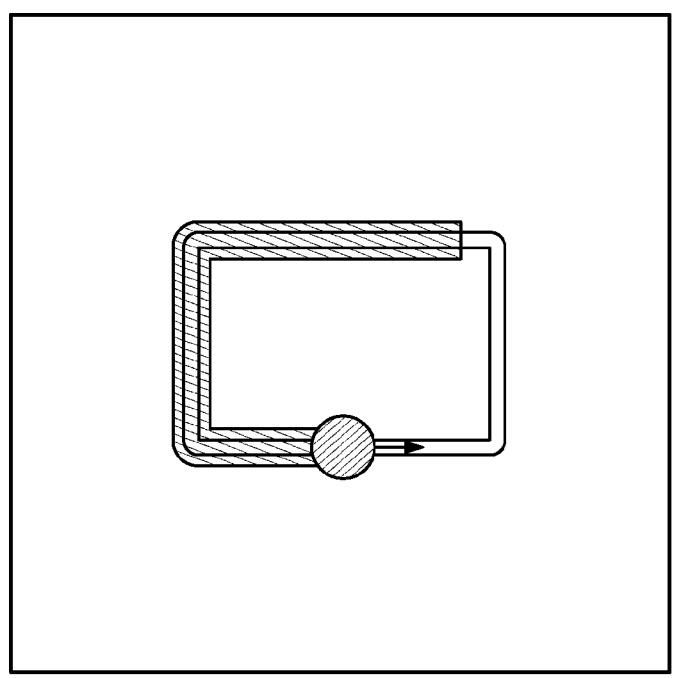
FIG. 4 shows a selective heating element with a movement pattern, which traces the part layer profile (vector scanning pattern).

For thin part features, such as thin walls, the spot heater may be moved above the part layer profile such that its center is always above the center of the thin profile. FIG. 4 shows such a situation for creation of a hollow cube. As an example, the wall thickness in this case may be 2 mm and the radius of the circular heater radiation area may be 4 mm. In both of these cases the wasted powder (powder sintered in areas other than the part itself) is reduced significantly as compared with the method using a heat radiating plate with a masking frame, or a passing heat-radiating bar.

The heater may be connected to the back of the print head and hence its motion may be provided by the same mechanism that moves the print head, such as during deposition of a sintering inhibitor. Sintering may be performed after the application of the inhibitor to the layer is completed, or it can be done concurrently, that is, as the inhibitor is printed in a raster-scanning manner, the heater sinters the segments that the print head has already passed.

Figure 5A:
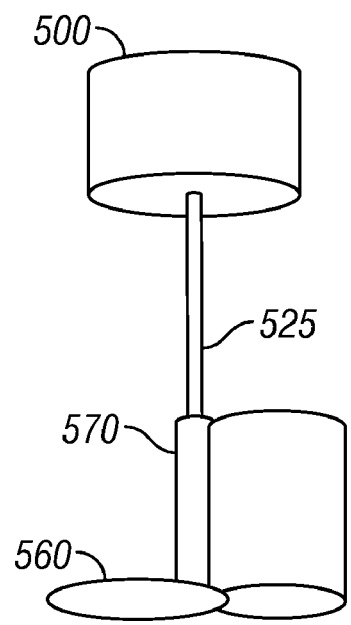
FIGS. 5A and B show a spot heater selective heating element with a shutter activated by a rotary solenoid.
Figure 5B:
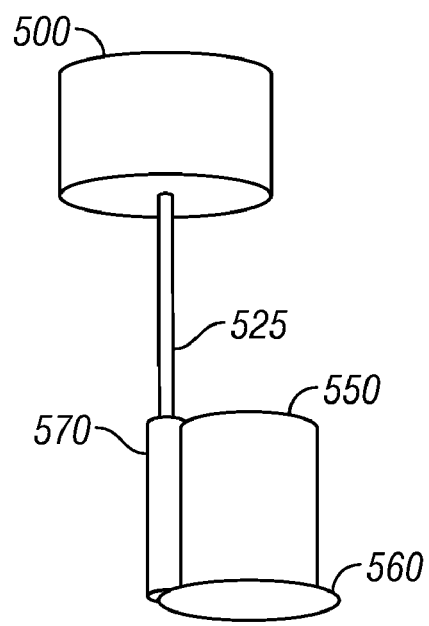

FIG. 5 shows a selective heating element. Heating element 550 may be an electric filament which could be a spirally-coiled nichrome ribbon (such as the type used in car cigarette lighters), a gas burner, an infra-red heater, or other forms of heat source. For example, the heating element may be made with nichrome wire coil wound around a ceramic tube, a quartz heater, an infrared lamp, or the like. The heating element 550 is connected to a sleeve 570 through which passes a rotatable shaft 525. The rotatable shaft 525 has at one end a solenoid 500 which upon activation rotates the shaft from a first position (as depicted in FIG. 5A) to a second position (as depicted in FIG. 5B) or vice versa. The shaft has at the opposite end and proximal to the heating element a shutter 560 that is capable of covering and exposing the heating element 550 during operation when heat is either not needed or needed, respectively.

Figure 6A:
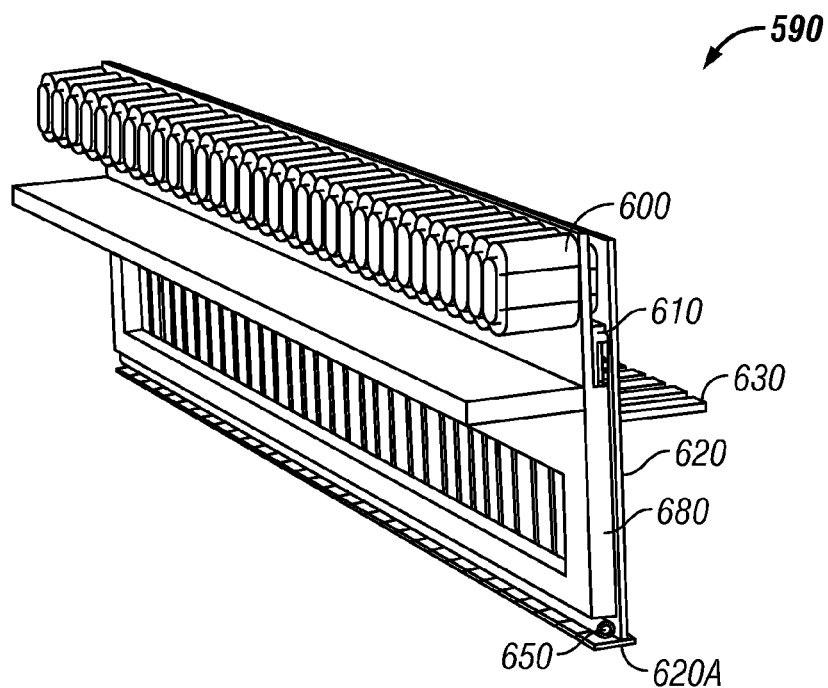
FIGS. 6A-C show a heater assembly comprising a plurality of individual heating elements.
Figure 6B:
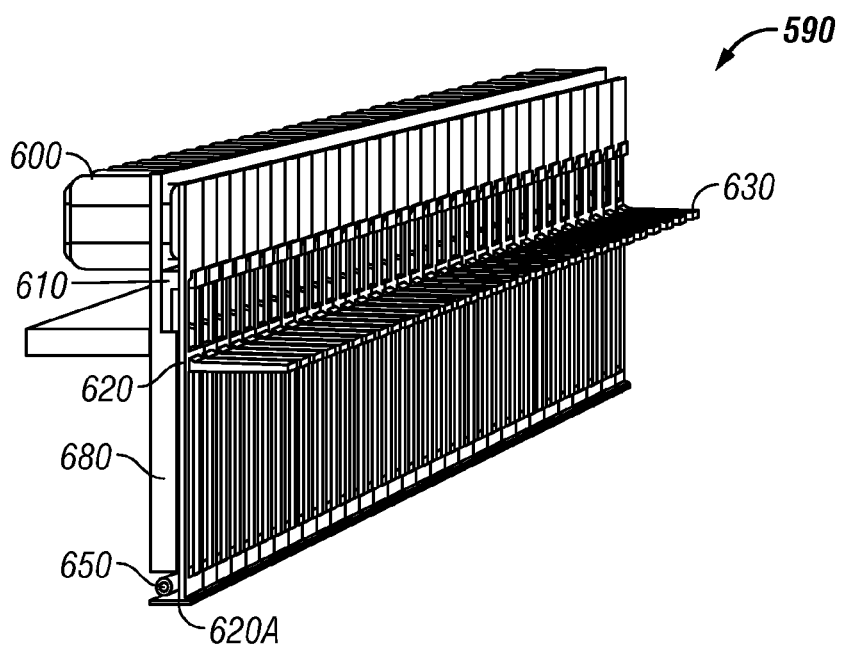
Figure 6C:
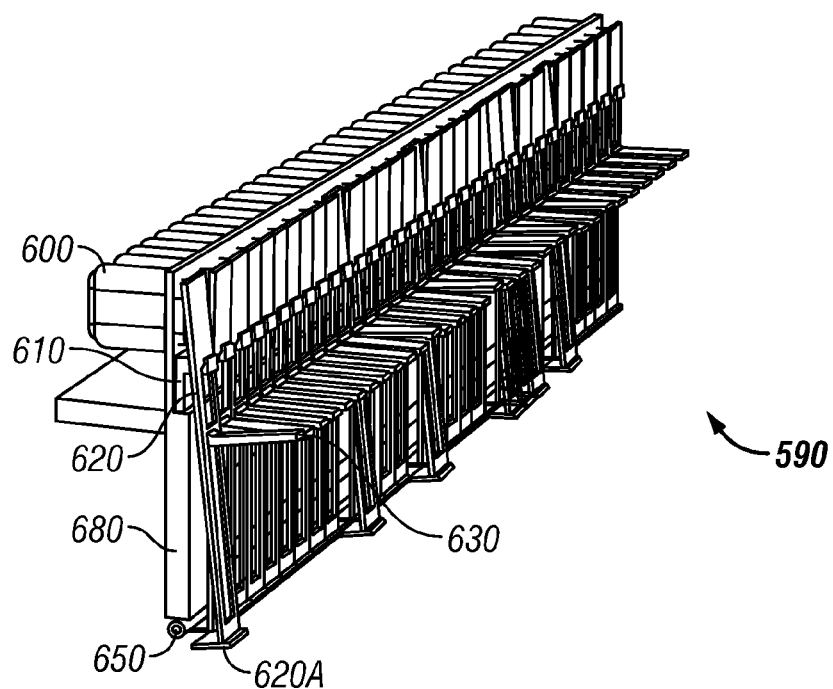
Figure 7:
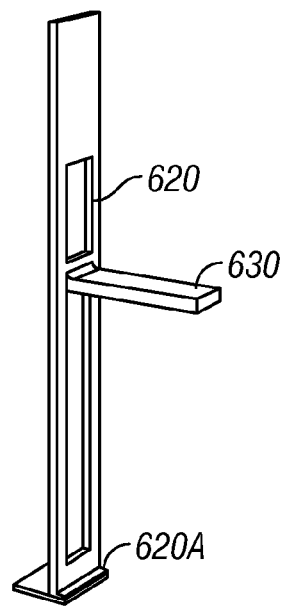
FIG. 7 shows a shutter lever in more detail.

FIGS. 6A and B show a bar heater 590. FIGS. 6A and 6B show the front and back of a bar heater with individual selective heating elements. FIGS. 6A and 6B show support structure 680 having a front and a backside. The support structure 680 comprises a hinge portion 610, which is located on one side of the support structure. Hinge portion 610 allows movement of shutter lever 620 between a first position and second position as depicted in FIG. 6C. The shutter lever 620 moves by activation of a solenoid 600. The shutter lever may be any material and will depend upon the solenoid construction. In one embodiment, the solenoid 600 is a magnetic coil and the shutter is a metallic object that can be attracted to the magnetic coil when the solenoid is activated. Shutter lever 620 optionally includes a weight balance 630 to assist in movement of the shutter lever 620 between a first position and second position. The weight balance 630 serves as a counterweight such that the lower part of the latch is always pushed forward toward the heating element 650, when the shutter lever 620 is hung from the hinge portion 610. All hinge portions may be made of a single metallic piece. The hook-type array shown in FIGS. 6 and 7 is easy to machine. FIG. 7 shows the shutter lever 620 in more detail.

In use, a bar heater 590 is passed over a powder bed to be sintered. As the bar heater 590 is moved over an area to be sintered solenoid 600 is actuated thereby attracting shutter lever 620 and moving shutter 620A to expose heating element 650 to the powder area to be sintered. As mentioned above, the heating element 650 may be made with nichrome wire coil wound around a ceramic tube, a quartz heater, an infrared lamp, a gas burner, or any other possible heat source. Typically, the heating element 650 will be installed under the lower edge of support structure 680 (e.g., a ceramic material) as shown in FIG. 6.

The shutter lever 620 also includes a shutter 620A that is capable of covering or exposing heating element 650 as needed during operation. Each shutter 620A is attached to the lower part of a shutter lever 620 such as a metallic latch (see FIG. 7) made of iron, steel, or any material that may be attracted to a magnet. The latch design can be stamped inexpensively out of sheet metal. An array of shutters 620A in the form of small panels is selectively brought between the heating element 650 and the powder surface to prevent sintering of areas that are not to be sintered. The shutters 620A may be made of a radiation-reflecting sheet with a layer of heat insulating material underneath.

Figure 8A:
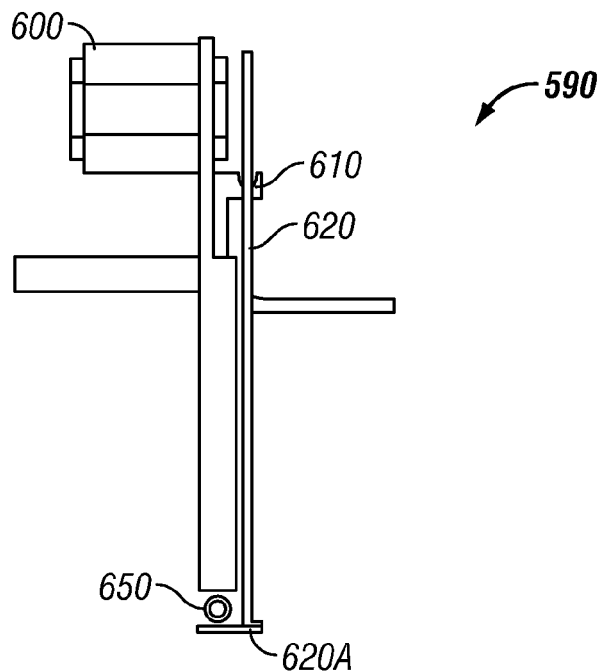
FIGS. 8A and B show end views of a bar heater.
Figure 8B:
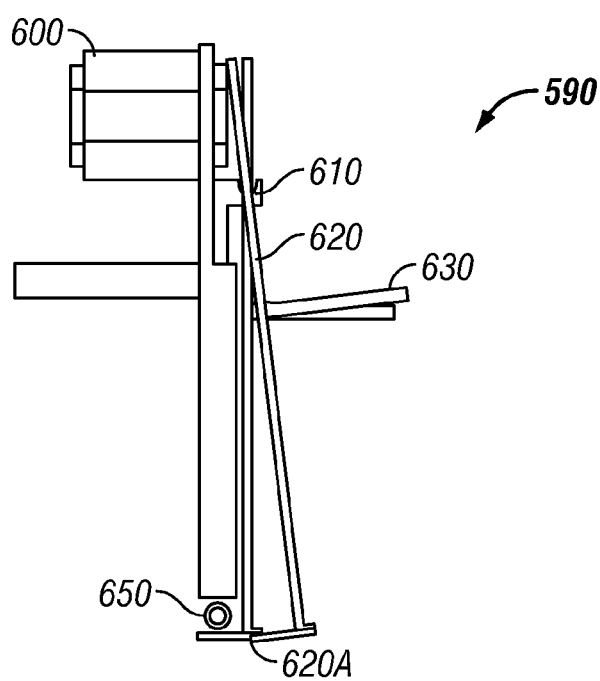

FIGS. 8A and 8B show an end view of a bar heater 590 in further detail. Shown are solenoids 600, shutter lever 620 sitting on hinge portion 610 (here a hook structure), shutter 620A, weight balance 630, and heating element 650. FIG. 8B depicts the movement of shutter lever 620 from a first position to a second position such that shutter 620A either exposes or covers heating element 650. The solenoid 600 can be an array of wire coils each with an iron core installed on the top section of the support 680 to create temporary magnetic field on demand.

To expose the powder section under a selected heating element 590, the corresponding shutter lever 620 is tilted by means of activating its corresponding electric magnet or solenoid 600, which attracts the top section of the shutter lever 620. This is shown in FIG. 8B. In the SIS process, after powder layer spreading and inhibitor deposition, the sintering takes place. Here the heater assembly is moved over the powder bed. Computer software determines which areas of the powder need to be exposed to heat based upon a CAD design present in the computer system. As the heater is passed over the powder bed, the computer activates and releases the shutter levers via the solenoids at locations specified by the software and based upon the item being fabricated. In addition, one of skill in the art will recognize that the entire bar heater assembly may be elevated (or tilted) upon powder spreading to avoid contaminating the heater assembly with powder material.

Also note that the resolution of this masking method along the motion path of the heater can be very fine because each electric magnet may be turned on and off with relatively high frequency, and hence could allow a small area to be exposed to heat. The sintering resolution along the motion direction could be very fine, but along the direction perpendicular to the motion path the resolution would depend on the number of masking elements used. For example, an 8" (approx 20 cm) wide powder bed sintered in the presence of a bar comprising 32 masking elements would provide a 0.25" (6.35 mm) sintering resolution along the direction perpendicular to the direction of motion.

In another aspect, a heating element that provides heated air is disclosed. The methods described so far are described using radiation to melt, for example, plastic particles. Radiation has certain limitations consisting of (i) only a small portion of the heater energy is used for sintering; most of the energy is dissipated through convection (by the heated air that flows and rises above the heat element, and (ii) only the top surfaces of those top powder particles that are exposed receive radiated heat; the rest of the particles in the layer receive heat only from these top particles through conduction. Besides resulting in a relatively slow sintering (because of poor heat conductivity of powder), this problem contributes to the powder layer deformation, because the top particles become more densely sintered than the lower ones.

An approach that alleviates the above problems is sintering by means of heated air. If the rate of flow is small, the hot air will not blow the powder particles. For example, as the particles on the top of the powder bed come in contact with hot air, they melt and bond and create a porous blanket that keeps any loose powder underneath from being blown away.

FIG. 9 shows a selective hot air heating element 900. An air hose 910 delivers cool air at a low rate to an air chamber 920, which stabilizes the incoming turbulent air. The air is directed toward an electric heat element 930. During operation solenoid 940 can be activated to move shutter lever 950, sitting on hinge portion 955 (here a hook structure), between a first position and a second position. The movement of shutter lever 950 results in movement of shutter 950A attached to the shutter lever 950. A weight balance 960 assists in pushing shutter lever 950 and shutter 950A to a position that blocks heating element 930 from being exposed to a powder surface. The shutter lever 950 is activated using solenoid 940, such as an electrically created magnetic field using a coil and an iron core, which attracts the shutter lever's top end upon activation.

FIGS. 10A and 10B show that, depending upon the position of a shutter lever 950, that hot air can either be directed downwards onto the powder surface (see, e.g., FIG. 10B), or directed sideways and up, away from the powder surface (see, e.g., FIG. 10A). In this arrangement, the air constantly flows and hence the heating element remains at a stable temperature.

Figure 11A:
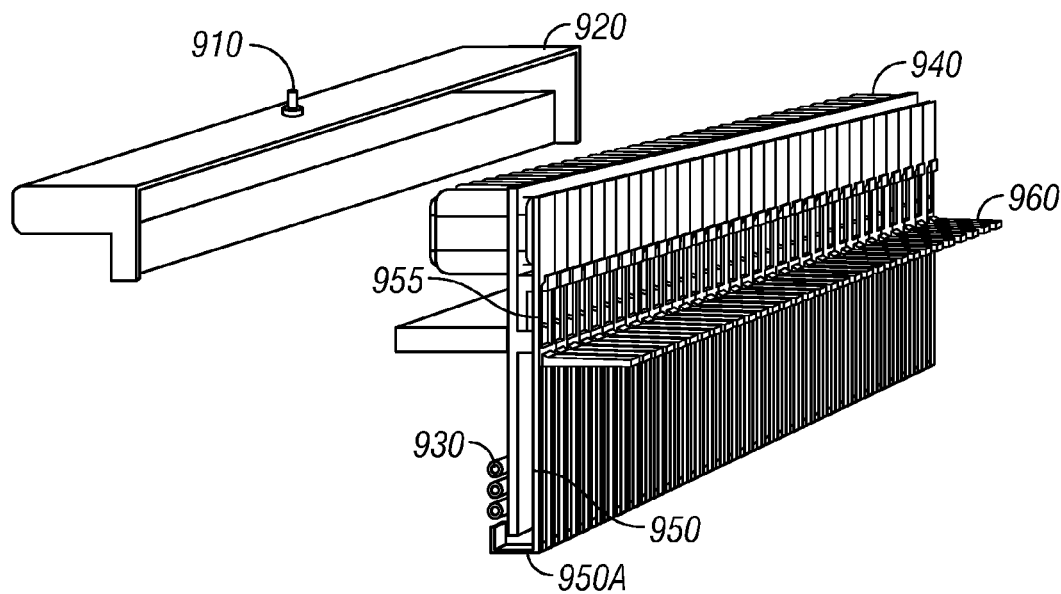
FIGS. 11A and B show exploded and assembled views of implementation of a selective hot air heating element to a bar heater with multiple shutters.
Figure 11B:
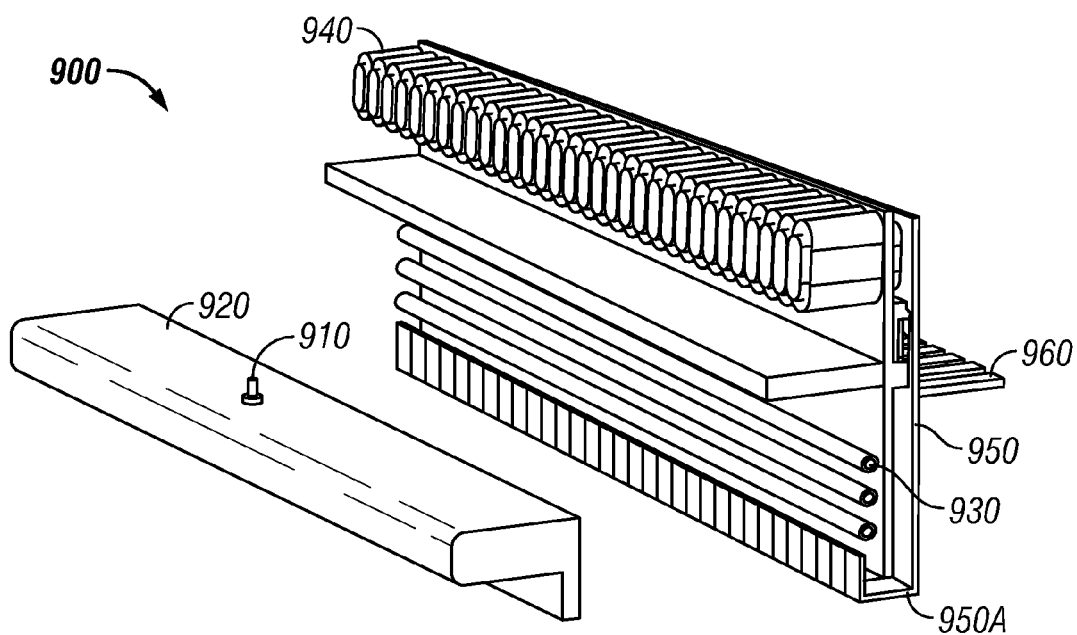

FIGS. 11A and 11B show an exploded and assembled views of an implementation of the hot air heater concept to a bar heater with multiple shutters. Shown are air chamber 920, which in the bar manifold embodiment includes a single or multiple independent air chambers that stabilize the incoming turbulent air. The air is then directed toward the electric heat elements 930. Also depicted is solenoid 940, shutter lever 950 sitting on hinge portion 955 (here a hook structure), shutter 950A, weight balance 960, and heating element 970.

Figure 1B:
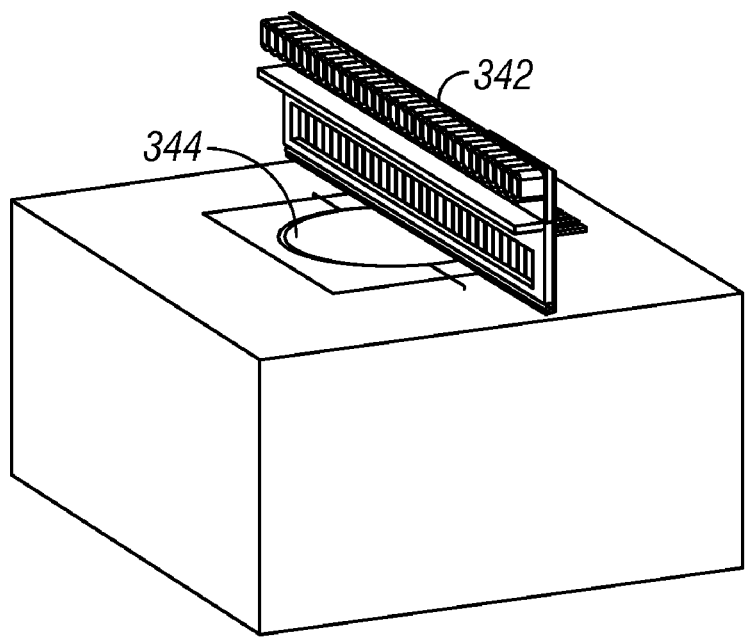
Figure 1C:
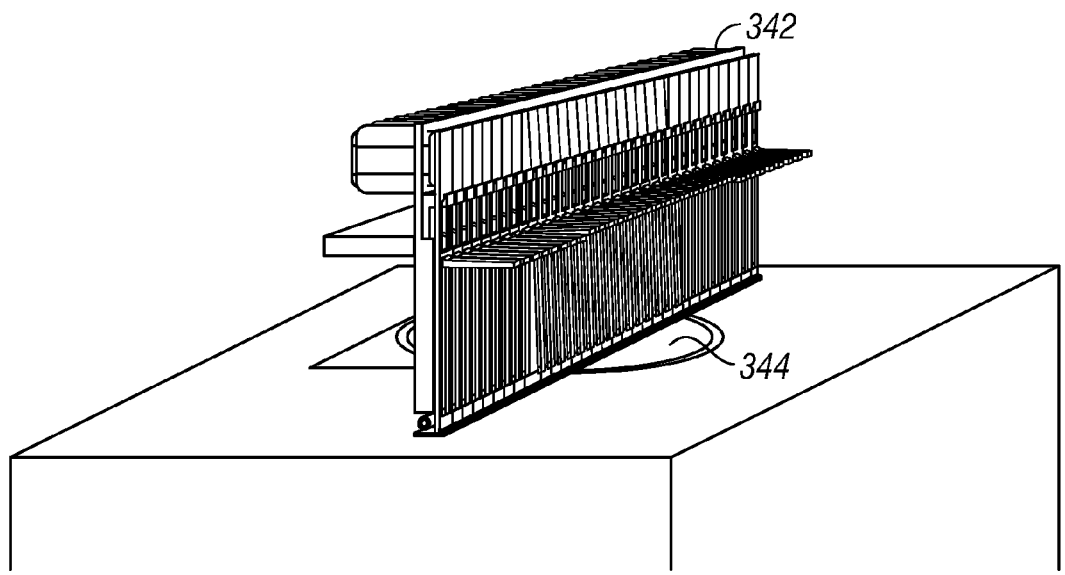

FIGS. 1A, 1B and 1C show an embodiment of a selective inhibition of sintering (SIS) process 300. The process 300 includes laying a thin powder layer, depositing a sintering inhibitor, and sintering the powder layer by heating using a selective heating element.

In the SIS process 300, a thin powder layer 312 is laid using a roller 314. The roller 314 sweeps a horizontal surface slightly above the previous layer and carries the powder material in front. This sweeping motion is performed while rotating, such that the roller's front surface makes an upward motion. This approach creates thin and uniformly dense powder layers 312.

The deposition of sintering inhibitor involves using an extrusion nozzle with a fine orifice 322, such as an inkjet printer head. The nozzle 322 is used to deposit sintering inhibitor that prevents the selected areas of the powder layer on the part's boundary surfaces from sintering under heat. A typical profile 324 of printed deposition of the sintering inhibitor material is shown. The deposition of different types of sintering inhibitors is discussed in detail herein.

In the illustrated embodiment, the sintering process involves using a selective heating element 342 (here depicted as a bar heater) to sinter the uninhibited areas 344 of the powder layer. The heating element 342 is scanned over specific areas of the powder layer to selectively sinter those specific areas. In one embodiment, the selective heating element is scanned in a raster fashion over the powder area and radiates heat only at an area where sintering is desired. In another aspect, as discussed below, the selective heating element includes a plurality of individual heating elements each of which can be selectively turned on or off to radiate heat at a desired position. Thus, in one aspect, the selective heating element comprises a bar comprising a plurality of individual heating elements. The bar is moved across the powder such that sintering occurs only at select areas by turning on and off one or more of the plurality of individual heating elements.

Figure 12:
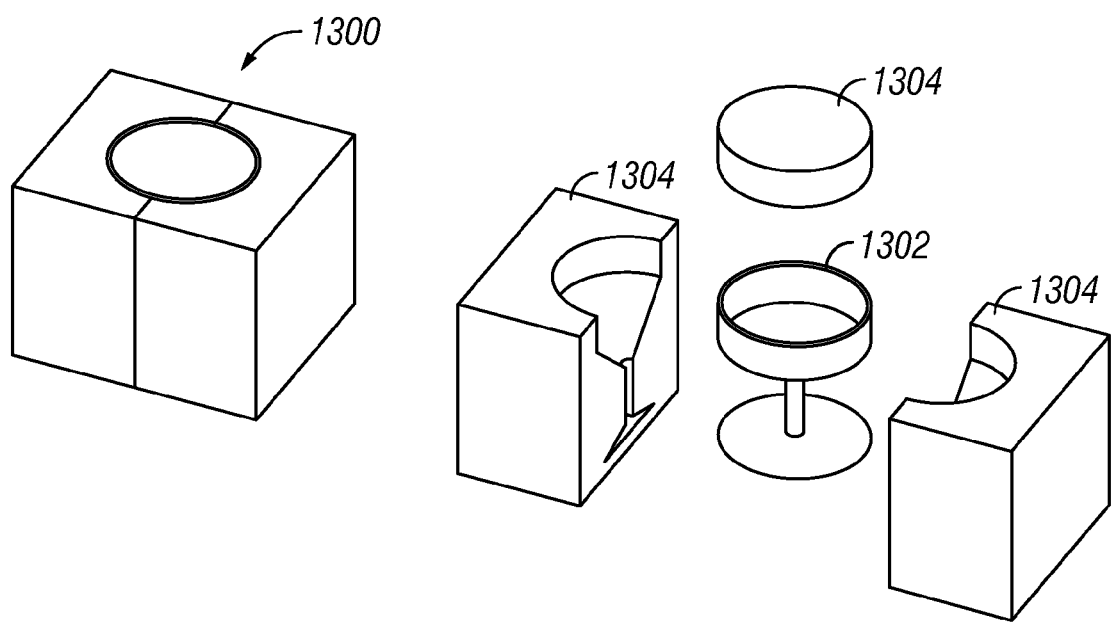
FIG. 12 shows an example of a solid 3-D object fabricated using the SIS process.

Referring now to FIG. 12, after all layers have been sintered 1300, the final part 1302 may be extracted. The unsintered powder may be reused and the excess material 1304 that is sintered may be crushed and recycled into a powder form.

As discussed above, the mechanisms for the deposition of the sintering inhibitor may involve several different implementations. In some implementations, thermal insulation may allow the sintering inhibitor to prevent the powder from achieving the temperature necessary for bonding. In other implementations, particle surface interference provides the inhibitor to occupy the interstitial voids of the powder matrix. Particle surface interference further provides the inhibitor to produce a mechanical barrier to bonding. An inhibitor that causes mechanical interference could be a solution that can leave solid crystal particles (such as salt water) after evaporation. The growth of crystal particles pushes the base powder particles away from each other, thereby preventing sintering.

As mentioned above, the SIS process uses selective heating elements. Thus, as an alternatives to using masking plates is the use of a passing heating bar, a radiation panel that is made out of a relatively small number (low resolution) of discrete heating elements that can each be independently activated such that a selected area of the powder layer is sintered. Another embodiment includes the use of a point heater that is large enough to scan the desired areas of each layer at a relatively high speed, and is small enough to minimize excessive powder sintering.

An alternative to sintering each successive layer is bulk sintering, in which partial sintering is performed after inhibitor application to each layer and once all layers are treated with the inhibitor liquid the entire powder volume in the build tank is transferred to a sintering oven. After sintering the part may be extracted from the unwanted sintered sections. To contain the loose powder volume for transfer to the oven, the periphery of each layer may be sintered by a fixed shape line heater (square or circular), or by a single point heater (spot heater) that sinters a thin line around the periphery of each layer using a profile that is as close as possible to the layer profile. The main advantages of the bulk sintering alternative are: a) it simplifies the machine (as no heating element or environmental temperature control would be needed), and b) it results in minimal part deformations due to the sintering of the entire part at once.

There are a number of advantages to the SIS process described herein. For example, an apparatus based on SIS will be far less expensive than the SLS machine because the high power laser generator of SLS is replaced with an inexpensive heat element and furthermore several of the environmental control features in SLS are unnecessary in SIS. In addition, the SIS process is fast because the entire layer can be rapidly and selectively sintered. The dimensional accuracy and surface quality of the fabricated parts is likely to be superior to that of 3D printing and SLS. Because it prints only on part boundary areas, SIS requires less inhibitor liquid to prevent sintering than the amount of binder liquid required to promote adhesion in 3D printing; therefore, there is relatively little spreading of the liquid through the powder. Also, high resolution (e.g., 3000 dpi or higher; roughly 8 micron line thickness) inkjet printers if used with fine powder particles (e.g., 1-5 micron) can enable SIS to produce parts much finer than what is currently possible with SLS and 3D Printing. Parts generated to date by SIS are already comparable in surface quality with those produced by SLS, and seem to be superior to those produced by 3D printing. Furthermore, SIS allows for fabrication of multi-color parts where various colors of the inhibitor agent are deposited (as in color inkjet printers), and if a post processing of the finished part is performed to permanently bond the color pigments to the part surfaces.

An advantage of an SIS process over the SLS process includes that an apparatus based on SIS may be less expensive than the equivalent SLS machine because the high power laser generator is replaced with an inexpensive selective heating element comprising radiating heat or heated air.

A number of embodiments of the invention have been described. Nevertheless, it will be understood that various modifications may be made without departing from the spirit and scope of the invention. Accordingly, other embodiments are within the scope of the following claims.

What is claimed is:

1. A selective heating apparatus for fabricating a three-dimensional (3-D) object, comprising:

an air manifold;

a heating element, in fluid communication with the air manifold, producing heated air within said air manifold;

an array of shutters arranged such that when the shutters are closed the array of shutters forms an outer-surface that blocks an outlet of the air manifold and restricts heated air from leaving the air manifold through the air manifold outlet, and the array of shutters being arranged such that when one or more selected shutters of the array of the shutters are opened the outer-surface is disrupted to release heated air at respective one or more selected locations of the air manifold outlet associated with the selectively opened one or more shutters;

a plurality of actuators corresponding to the array of shutters such that a shutter of the array is connected with an associated actuator of the plurality of the actuators through a shutter lever comprising a first end proximal to the associated actuator and a distal end proximal to the shutter, wherein the associated actuator is configured to move the shutter lever from a closed position to an opened position thereby moving the shutter at the distal end to transition from restricting heated air from leaving the air manifold to releasing heated air from the air manifold at the selected location; and a computer communicatively coupled with the plurality of actuators and configured to
position the outer-surface of the air manifold outlet formed by the array of shutters with respect to a cross-section of said 3-D object using a drive mechanism, and
actuate one or more select actuators of the plurality of the actuators to open corresponding select one or more shutters of the array to provide heated air from the positioned air manifold outlet at one or more locations of the cross-section of said 3-D object selected in accordance with a profile of the cross-section of said 3-D object.

2. The selective heating apparatus of claim 1, wherein the air manifold further comprises an inlet port.

3. The selective heating apparatus of claim 1, wherein each of the plurality of actuators is a solenoid.

4. The selective heating apparatus of claim 1, wherein each of the plurality of actuators is a magnetic coil.

5. The selective heating apparatus of claim 2, wherein the shutter lever is metallic.

6. The selective heating apparatus of claim 1, wherein the computer comprises a computer system associated with computer-aided design (CAD) profiles of cross-sections of said 3-D object.

7. The selective heating apparatus of claim 1, wherein a width of the air manifold outlet is substantially equal to a first lateral dimension of each of the shutters in the array, and a length of the air manifold outlet is substantially equal to multiplicative product of a quantity of shutters in the array and a second lateral dimension of each of the shutters in the array.

8. The selective heating apparatus of claim 7, wherein the quantity of the shutters in the array determines a fabrication resolution on the cross-section of said 3-D object along a direction orthogonal to a direction of a lateral translation.

* * * * *